United States Patent
Dudar

(10) Patent No.: US 10,060,379 B2
(45) Date of Patent: Aug. 28, 2018

(54) METHOD FOR A HYBRID VEHICLE

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 300 days.

(21) Appl. No.: 14/845,566

(22) Filed: Sep. 4, 2015

(65) Prior Publication Data
US 2017/0066322 A1 Mar. 9, 2017

(51) Int. Cl.
| | | |
|---|---|---|
| *B60L 9/00* | (2006.01) | |
| *F02D 41/26* | (2006.01) | |
| *B60W 20/00* | (2016.01) | |
| *F02D 33/00* | (2006.01) | |
| *F02D 41/30* | (2006.01) | |
| *B60K 15/03* | (2006.01) | |

(52) U.S. Cl.
CPC .............. *F02D 41/26* (2013.01); *B60K 15/03* (2013.01); *B60W 20/00* (2013.01); *F02D 33/006* (2013.01); *F02D 41/30* (2013.01); *B60K 2015/03098* (2013.01); *B60K 2015/03361* (2013.01); *B60W 2560/02* (2013.01); *B60W 2710/0616* (2013.01); *Y10S 903/905* (2013.01)

(58) Field of Classification Search
CPC combination set(s) only.
See application file for complete search history.

(56) References Cited

U.S. PATENT DOCUMENTS

| | | | |
|---|---|---|---|
| 5,542,934 A | 8/1996 | Tomisawa | |
| 8,290,684 B2 | 10/2012 | Yuen et al. | |
| 8,321,158 B2 | 11/2012 | Proefke et al. | |
| 9,008,880 B2 | 4/2015 | Sangameswaran et al. | |
| 2005/0080543 A1* | 4/2005 | Lu | B60G 17/018 701/70 |
| 2007/0141413 A1* | 6/2007 | Nielsen | H01M 8/04194 429/431 |
| 2008/0152216 A1* | 6/2008 | Meadow | G06F 17/30241 382/154 |
| 2008/0262665 A1* | 10/2008 | Coulmeau | G08G 5/0039 701/16 |
| 2009/0084623 A1* | 4/2009 | Dagenais | B60T 8/1706 180/210 |

(Continued)

FOREIGN PATENT DOCUMENTS

JP -03043638 A * 2/1991

OTHER PUBLICATIONS

Zhang, X., "Method and System for Vacuum Generation Using a Throttle Body Comprising a Slidable Throttle Valve," U.S. Appl. No. 14/945,254, filed Nov. 18, 2015, 62 pages.

*Primary Examiner* — Redhwan K Mawari
(74) *Attorney, Agent, or Firm* — Julia Voutyras; McCoy Russell LLP

(57) ABSTRACT

Methods and systems are provided for a fuel system in a hybrid vehicle. In one example, a method includes activating a fuel pump in a fuel tank included in the hybrid vehicle responsive to a refueling event with a level of residual fuel higher than a fill threshold. By activating the fuel pump, residual fuel in the fuel tank is mixed with newly received fuel in the refueling event enabling improved combustion in a subsequent engine-on condition.

20 Claims, 7 Drawing Sheets

(56) References Cited

U.S. PATENT DOCUMENTS

| | | | |
|---|---|---|---|
| 2009/0112442 A1* | 4/2009 | Tsunooka | F02D 19/0684 701/103 |
| 2009/0298364 A1* | 12/2009 | Kato | F02M 37/18 440/88 F |
| 2010/0198438 A1 | 8/2010 | Iraha et al. | |
| 2011/0172881 A1* | 7/2011 | Seidel | B60T 8/1706 701/37 |
| 2012/0234015 A1* | 9/2012 | Reuter | F02C 7/236 60/776 |
| 2012/0283929 A1* | 11/2012 | Wakita | A61G 5/04 701/99 |
| 2012/0287274 A1* | 11/2012 | Bevirt | H04N 7/185 348/144 |
| 2013/0250047 A1* | 9/2013 | Hollinger | H04N 5/2252 348/36 |
| 2013/0268182 A1 | 10/2013 | Treharne et al. | |
| 2013/0291836 A1* | 11/2013 | Klesse | F02D 41/3854 123/458 |
| 2014/0048042 A1* | 2/2014 | Gurin | F02D 41/00 123/456 |
| 2014/0200780 A1* | 7/2014 | Watanabe | B60T 8/1706 701/68 |
| 2014/0297071 A1* | 10/2014 | Dudar | F02D 41/22 701/22 |

* cited by examiner

METHOD FOR A HYBRID VEHICLE

FIELD

The present description relates generally to methods and systems for a fuel system in a hybrid vehicle.

BACKGROUND/SUMMARY

Engines in hybrid vehicles may operate for shorter durations enabling fuel economy and reduced fuel emissions. However, these shorter engine operation times can lead to fuel residing in a fuel tank for longer intervals. Further, a vehicle operator may refuel the fuel tank even though the fuel tank contains residual fuel. For example, vehicle operators may fill the fuel tanks in spite of considerable residual fuel when fuel prices are lower, when a favored filling station is nearby, or prior to a long trip. Thus, the fuel tank may contain different fuels after a refueling event. Specifically, residual fuel (prior to refueling) in the fuel tank may have a distinct octane rating, a distinct ethanol content, or a different volatility relative to new fuel received during the refueling event. If the hybrid vehicle is operated in an engine-off mode following the refueling event, residual fuel and fuel received during refueling may remain substantially unmixed. Furthermore, engine operation at a later time may be adversely affected by fueling errors due to non-uniformity of the fuel. For example, an ethanol estimation routine that is activated when engine operation is commenced may produce distorted results causing errors in fuel injection and air/fuel ratio. As such, fueling errors can produce combustion instabilities and reduce engine performance.

The inventor herein has recognized the above issues and identified an approach to at least partly address the issues. In one example approach, a method for a hybrid vehicle is provided, comprising responsive to a refueling event with an amount of residual fuel in a fuel tank higher than a threshold fill, activating a fuel pump located within the fuel tank without injecting any fuel to the engine. In this way, residual fuel and newly received fuel may be blended in the fuel tank.

As one example, a hybrid vehicle may be propelled by one or more of an engine and a motor. When the engine is activated and combusting, the engine may receive fuel from a fuel tank coupled in the hybrid vehicle. Specifically, an electrically actuated fuel pump may supply fuel from the fuel tank to the engine. If an operator of the vehicle initiates a refueling event even though the fuel tank contains fuel with a fill level that is higher than a threshold, the fuel pump may be actuated to promote mixing of residual fuel with fresh fuel. In one example, the fuel pump may be activated during the refueling event. In another example, the fuel pump may be activated immediately following the refueling event if the hybrid vehicle begins operating in an engine-off mode (e.g., when the engine is shut down to rest). As such, the fuel pump may be activated during (or subsequent to) the refueling event without operating the engine.

In this way, a fuel tank may comprise fuel of a more uniform composition subsequent to refueling with a substantial amount of residual fuel in the fuel tank. Fresh fuel entering the fuel tank may be mixed with residual fuel existing in the fuel tank (prior to refueling) by activating the fuel pump in response to the refueling event. The technical effect of ensuring that fuel in the fuel tank has a more uniform composition is that fueling errors may be reduced and a desired air/fuel ratio may be achieved during engine operation. Since the fuel pump is activated without operating the engine, fuel economy may be maintained. Overall, a desired engine performance may be realized.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
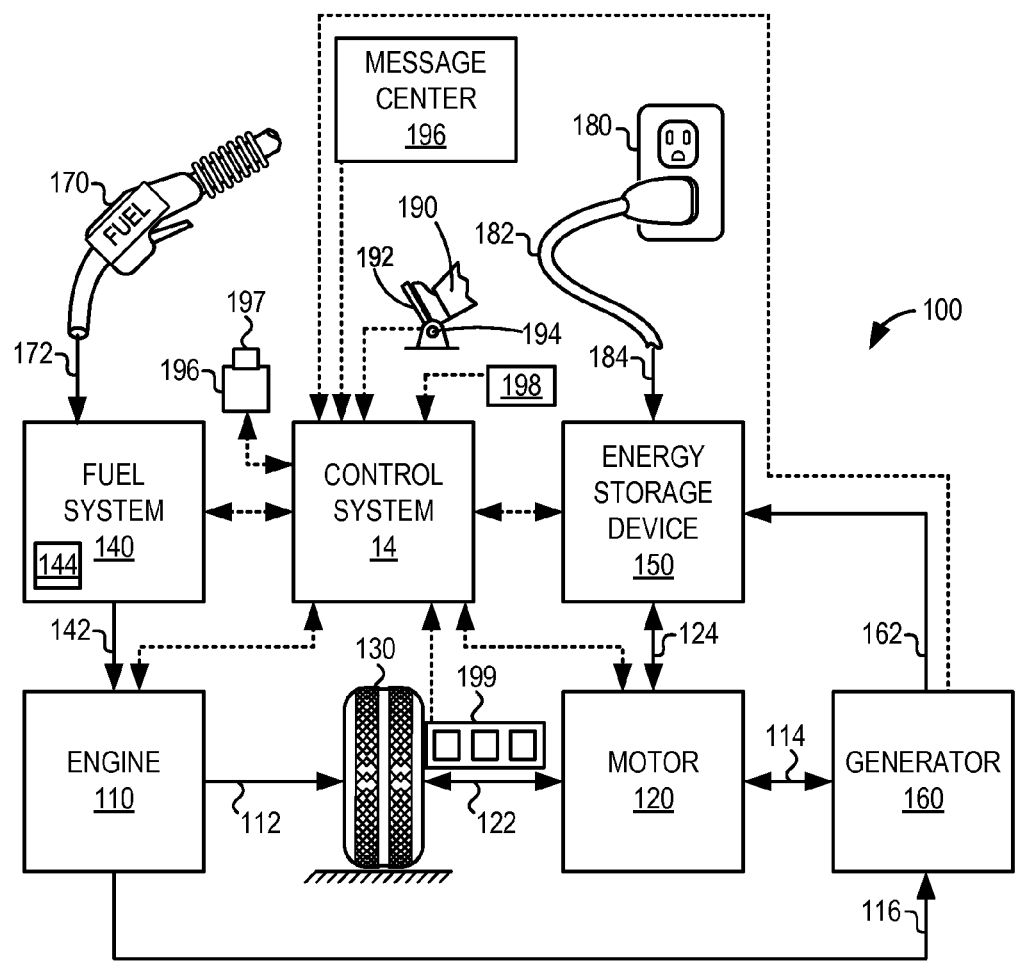
FIG. 1 illustrates an example vehicle propulsion system.
Figure 2:
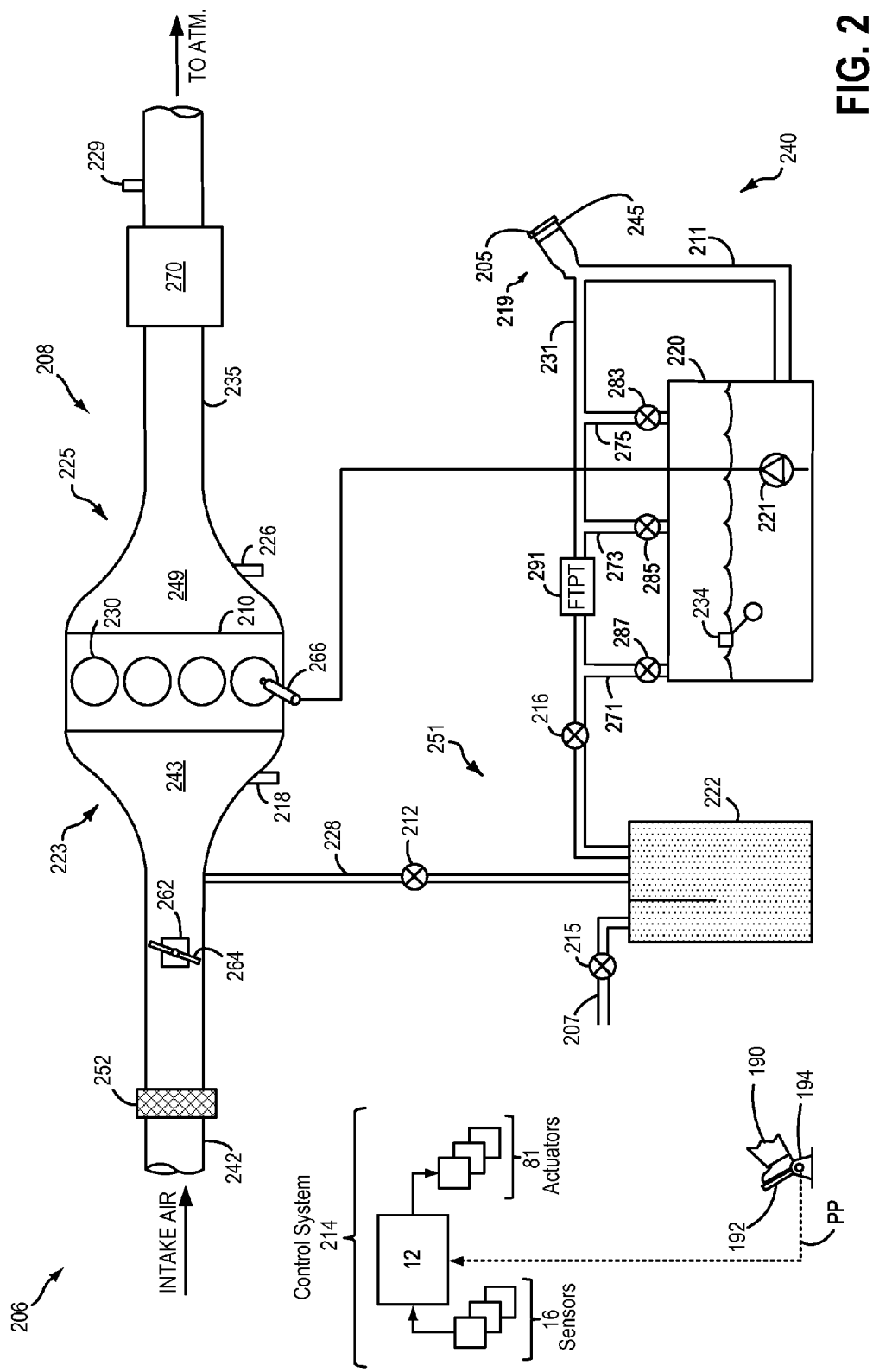
FIG. 2 shows an example vehicle system with a fuel system and an evaporative emissions system.

The following description relates to systems and methods for mixing fuel in a fuel tank of a vehicle, such as the vehicle system of FIG. 1, by actuating a fuel pump in a fuel system, such as the fuel system shown in FIG. 2, in response to a refueling event. The fuel system may be coupled in the vehicle and may fuel an engine of the vehicle. A controller in the vehicle may be configured to perform a routine, such as the routine of FIGS. 3A and 3B, to activate the fuel pump in response to the refueling event when an existing fuel fill in the fuel tank is higher than a threshold. The fuel pump may be activated during the refueling event wherein the fuel pump is operational for a duration that overlaps a duration of the refueling event. Alternatively, the fuel pump may be operated after the refueling event is completed (FIG. 4). Herein, the duration of fuel pump operation may be mutually exclusive of the duration of the refueling event. Further, the fuel pump may be activated in both cases without injecting any fuel into the engine and with the engine shut down to rest. Further still, if a leak test of the fuel system is desired subsequent to the refueling event, the leak test may be delayed (FIG. 5) until pressure in the fuel tank stabilizes after fuel pump operation. As such, the fuel pump may be operated during engine operation based on existing engine conditions, and may additionally be operated during an engine-off condition based on refueling of the fuel tank (FIG. 6). Accordingly, the composition of fuel in the fuel tank after refueling may be more even.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV) or simply a hybrid vehicle.

Vehicle propulsion system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via drive wheel 130 as indicated by arrow 122 while engine 110 is deactivated. Herein, the engine may be shut down to rest while the motor propels vehicle motion.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Thus, liquid fuel may be supplied from fuel tank 144 to engine 110 of the motor vehicle shown in FIG. 1. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 14 may communicate with one or more of engine 110, motor 120, fuel system 140, energy storage device 150, and generator 160. Control system 14 may receive sensory feedback information from one or more of engine 110, motor 120, fuel system 140, energy storage device 150, and generator 160. Further, control system 14 may send control signals to one or more of engine 110, motor 120, fuel system 140, energy storage device 150, and generator 160 responsive to this sensory feedback. Control system 14 may receive an indication of an operator requested output of the vehicle propulsion system from a vehicle operator 190. For example, control system 14 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 14 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 14 may receive an indication of the level of fuel stored at fuel tank 144 via a fuel level sensor. The level of fuel stored at fuel tank 144

(e.g., as identified by the fuel level sensor) may be communicated to the vehicle operator, for example, via a fuel gauge or indication in a vehicle instrument panel 196.

Fuel in fuel tanks of hybrid vehicles may not be used for combustion for substantially long durations (e.g., months) if the hybrid vehicle is operated in an electric mode (e.g., engine-off mode). The hybrid vehicle may be operated in the electric mode for months if the vehicle operator decides to recharge the energy storage device regularly and constantly and if the vehicle is driven largely on surface streets without activating the engine.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 14. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an emissions control system 251 (also termed, an evaporative emissions system) and a fuel system 240. Emission control system 251 includes a fuel vapor container or canister 222 which may be used to capture and store fuel vapors. In some examples, vehicle system 206 may be a hybrid electric vehicle system. In one example, hybrid vehicle system 206 may be configured as vehicle propulsion system 100 of FIG. 1.

The engine system 208 may include an engine 210 having a plurality of cylinders 230. Engine 210 may be controlled at least partially by a control system 214 including a controller 12 and by input from a vehicle operator 190 via an input device 192. In this example, input device 192 includes an accelerator pedal and a pedal position sensor 194 for generating a proportional pedal position signal PP. As such, engine 210 may be similar to engine 110 of FIG. 1 while control system 214 of FIG. 2 may be the same as control system 14 of FIG. 1.

Engine 210 includes an engine intake 223 and an engine exhaust 225. The engine intake 223 includes a throttle 262 coupled to intake manifold 243. Fresh intake air enters intake passage 242 and flows through air filter 252 before streaming past throttle 262 (also termed intake throttle 262) into intake manifold 243. Throttle 262 includes a throttle plate 264. In the depicted example a position of the intake throttle 262 (specifically, a position of the throttle plate 264) may be varied by controller 12 of control system 214 via a signal provided to an electric motor or actuator included with intake throttle 262, a configuration that is commonly referred to as electronic throttle control (ETC). In this manner, throttle 262 may be operated to vary an amount of intake air provided to intake manifold 243 and the plurality of cylinders therein.

The engine exhaust 225 includes an exhaust manifold 249 leading to an exhaust passage 235 that routes exhaust gas to the atmosphere. The engine exhaust 225 may include one or more emission control devices 270 (also termed emissions catalyst), which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 240 may include a fuel tank 220 coupled to a fuel pump 221. Fuel pump 221 is depicted situated within fuel tank 220 and supplying fuel to fuel injector 266 of engine 210. Further, fuel pump 221 may be a variable speed pump wherein the speed of the fuel pump can be modulated via the controller 12 based on different conditions. Alternatively, fuel pump 221 may be capable of operation at a single speed. As such, fuel pump 221 may be at least partially submerged or surrounded by fuel in fuel tank 220. It will be noted that alternative embodiments may include fuel pump 221 positioned outside of fuel tank 220 without departing from the scope of this disclosure. Herein, fuel pump 221 may not be surrounded by or submerged within fuel. Fuel tank 220 may be similar to fuel tank 144 introduced in FIG. 1. In one example, fuel tank 220 may include a liquid fuel such as gasoline. In another example, liquid fuel in fuel tank 220 may be gasoline and ethanol (e.g., E10, E85, etc.).

Fuel system 240 may include additional fuel pumps for pressurizing fuel delivered to the fuel injectors of engine 210. While only a single fuel injector 266 is shown in FIG. 2, additional injectors are provided for each of the plurality of cylinders 230. It will be appreciated that fuel system 240 may be a return-less fuel system, a return fuel system, or various other types of fuel system. A fuel level sensor 234 located in fuel tank 220 may provide an indication of the fuel level ("Fuel Level Input" or FLI) to controller 12. As depicted, fuel level sensor 234 may comprise a float connected to a variable resistor. Alternatively, other types of fuel level sensors may be used.

Vapors generated in fuel system 240 may be routed to evaporative emissions control system 251, specifically to fuel vapor canister 222 via vapor recovery line 231, before being purged to the engine intake 223. Fuel vapor canister 222 may also be termed fuel system canister or simply, canister 222 herein.

Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275. Further, in some examples, one or more fuel tank vent valves may be included in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system 219 may include a fuel cap 205 for sealing off the fuel filler system from the atmosphere. Fuel filler system 219 may also be termed refueling system 219. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 12, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Fuel vapor canister 222 in evaporative emissions control system 251 may be filled with an appropriate adsorbent to temporarily trap fuel vapors (including vaporized hydrocarbons). Fuel vapor canisters in hybrid vehicles may receive refueling vapors generated during fuel tank refilling operation as well as diurnal vapors generated during daily changes in ambient temperature. In one example, the adsorbent used is activated charcoal. While a single canister 222 is shown, it will be appreciated that emissions control system 251 may include any number of canisters.

When purging conditions are met, such as when the canister is saturated, vapors stored in fuel system canister 222 may be purged to engine intake 223, specifically intake manifold 243, via purge line 228 by opening canister purge valve 212 (also termed, purge valve 212). Fresh air may be drawn through vent line 207 via canister vent valve 215 into canister 222 to enable desorption of stored fuel vapors from emissions control system 251. For example, canister vent valve 215 may be a normally open valve, which may be maintained open to draw fresh air into the canister 222 via vent line 207. Canister purge valve 212 may be normally closed but may be opened during certain conditions so that vacuum from engine intake manifold 243 is provided to the fuel vapor canister for purging desorbed fuel vapors.

Flow of air between canister 222 and the atmosphere may be regulated by canister vent valve 215. Fuel tank isolation valve 216 (FTIV 216) may control venting of vapors from fuel tank 220 into the canister 222 (and air into atmosphere). FTIV 216 may be positioned between the fuel tank and the fuel vapor canister within conduit 231. FTIV 216 may be a normally closed valve that when opened allows for the venting of fuel vapors from fuel tank 220 to canister 222. Air stripped of fuel vapors may then be vented from canister 222 to atmosphere via canister vent valve 215 and vent line 207. Fuel vapors stored in canister 222 may be purged to engine intake 223 via canister purge valve 212 at a later time.

Fuel system 240 may be operated by controller 12 in a plurality of modes by selective adjustment of the various valves and solenoids. For example, the fuel system may be operated in a fuel vapor storage mode (e.g., during a fuel tank refueling operation and with the engine not operating), wherein the controller 12 may open FTIV 216 and maintain canister vent valve 215 open while closing canister purge valve (CPV) 212 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 12 may open FTIV 216 and canister vent valve 215, while maintaining canister purge valve 212 closed, to depressurize the fuel tank before allowing fuel to be added therein. As such, FTIV 216 may be kept open during the refueling operation to allow refueling vapors to be stored in the canister. After refueling is completed, the FTIV may be closed.

As yet another example, the fuel system may be operated in a canister purging mode (e.g., after an emission control device light-off temperature has been attained and with the engine operating), wherein the controller 12 may open canister purge valve 212 and canister vent valve 215 while closing FTIV 216. Herein, the vacuum generated by the intake manifold of the operating engine may be used to draw fresh air through vent line 207 and through fuel vapor canister 222 to purge the stored fuel vapors into intake manifold 243. In this mode, the purged fuel vapors from the canister are combusted in the engine. The purging may be continued until the stored fuel vapor amount in the canister is below a load threshold.

Controller 12 may comprise a portion of a control system 214. Control system 214 is shown receiving information from a plurality of sensors 16 (various examples of which are described herein) and sending control signals to a plurality of actuators 81 (various examples of which are described herein). As one example, sensors 16 may include fuel level sensor 234, exhaust gas sensor 226 located upstream of the emission control device 270, manifold absolute pressure (MAP) sensor 218, post-catalyst exhaust sensor 229, and fuel tank pressure sensor 291 (also termed a fuel tank pressure transducer or FTPT). Other sensors such as barometric pressure, ambient temperature, air/fuel ratio, and composition sensors may be coupled to various locations in the vehicle system 206. For example, temperature of fuel in the fuel tank may be monitored via a fuel tank temperature sensor (not shown). As another example, the actuators 81 may include fuel injector 266, throttle 262, fuel tank isolation valve 216, fuel pump 221, purge valve 212, and refueling lock 245. The controller 12 may receive input data from the various sensors, process the input data, and trigger the actuators in response to the processed input data based on instruction or code programmed therein corresponding to one or more routines. Example control routines are described herein with regard to FIGS. 3A, 3B, 4, and 5.

The controller may employ various actuators (such as those described above) to adjust engine operation, and vehicle operation based on signals received from the various sensors and instructions stored on a memory of the controller. For example, adjusting an opening of CPV 212 may include adjusting an actuator (e.g., a solenoid) of the CPV to adjust an opening of the CPV. The controller may command the actuator and the solenoid may be actuated at a duty cycle responsive to the command.

A hybrid vehicle, e.g., vehicle system 206, may operate for extended durations without consuming fuel, such as gasoline, in a fuel tank of the hybrid vehicle. In other words, the hybrid vehicle may be propelled via motor torque alone for considerable periods of time and the engine, such as engine 210, may remain deactivated and shut down. In such cases, a sizeable quantity of fuel may reside in the fuel tank for extended intervals. The fuel can age within the tank and may adversely affect cold starts of the engine. Further, the residual fuel may have an altered volatility, or gained moisture and become stale over the duration of storage.

Herein, if a vehicle operator fills up the fuel tank despite the presence of residual fuel in the fuel tank, at least two types of fuel may be held within the fuel tank. The vehicle operator may refuel the fuel tank despite the fuel tank containing residual fuel due to reasons such as proximity of a favored gas station or a desired brand of gasoline, a lower price of the fuel, or in anticipation of a long driving trip.

As such, fresh fuel received during refueling may remain substantially separate (e.g., at least 90% unblended) from residual fuel existing in the fuel tank prior to refueling. This issue may be more likely in a fuel tank that receives fuel from the top (e.g., if the fuel tank is a top feeder). Further, the fuels in the fuel tank (e.g., the residual fuel and the newly received fuel during refueling) may differ based on their respective ethanol content, volatility, and/or octane rating. For example, residual fuel in the fuel tank prior to refueling may be a winter fuel while newly received fuel may be a summer fuel e.g., each fuel may have different volatility or Reid vapor pressures. Accordingly, the fuel pump coupled to the fuel tank may be activated in response to the refueling to enable mixing of the residual fuel and the newly received fuel. By blending the two fuels, a more uniform composition of fuel may be provided in the fuel tank. For example, the composition of the blended fuel may be an average of the properties of the two fuels (or more fuels) in the fuel tank. Further details of activation of the fuel pump in response to the refueling will be described below.

It will be noted that newly received fuel as used herein indicates fresh fuel received from the refueling pump (e.g., via fuel dispensing device 170 of FIG. 1) in the fuel tank during the refueling event. Residual fuel as used herein refers to fuel already present in the fuel tank prior to the refueling event.

Figure 3A:
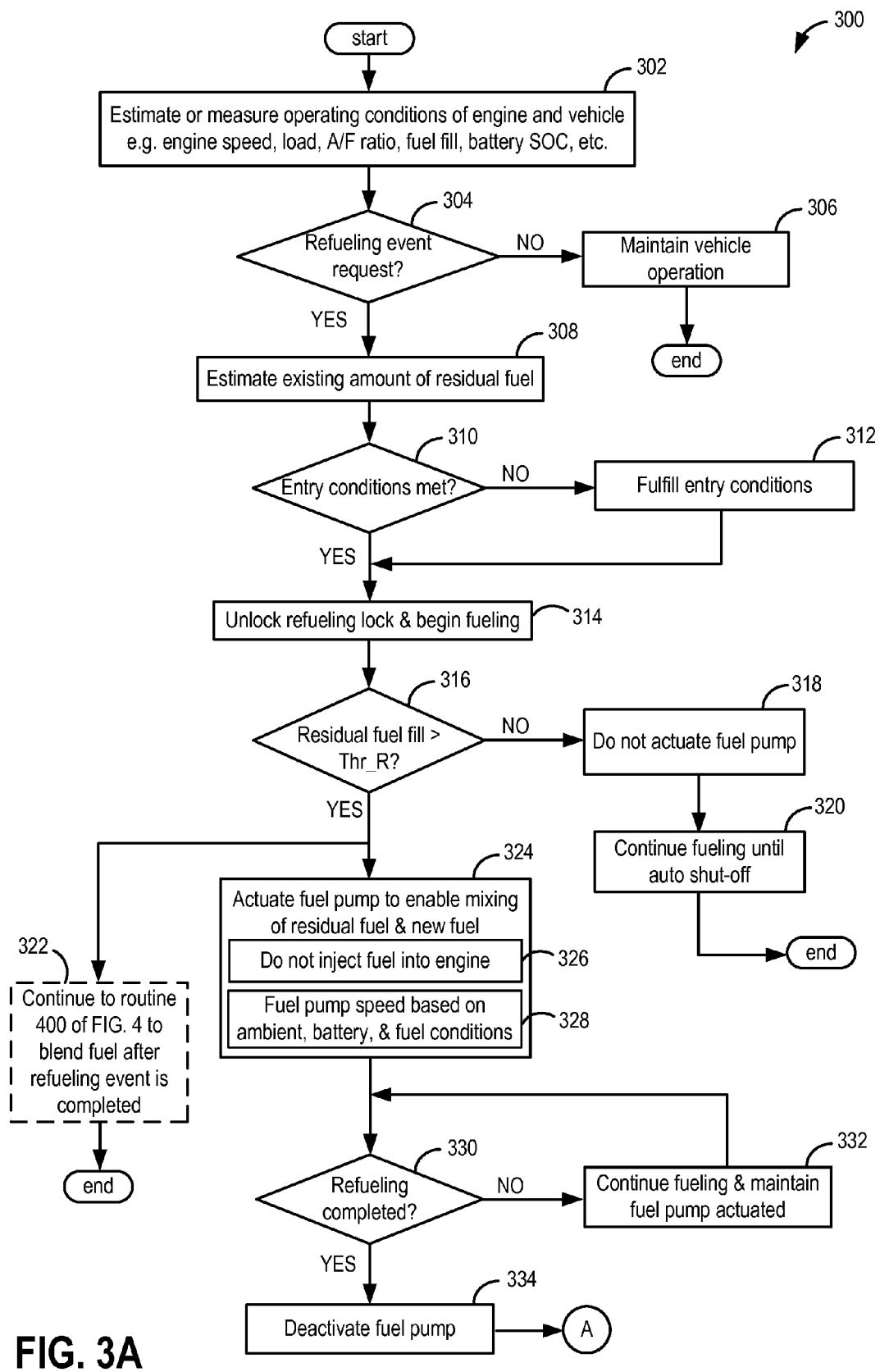
FIGS. 3A and 3B present a high level flowchart for actuating a fuel pump during a refueling event.
Figure 3B:
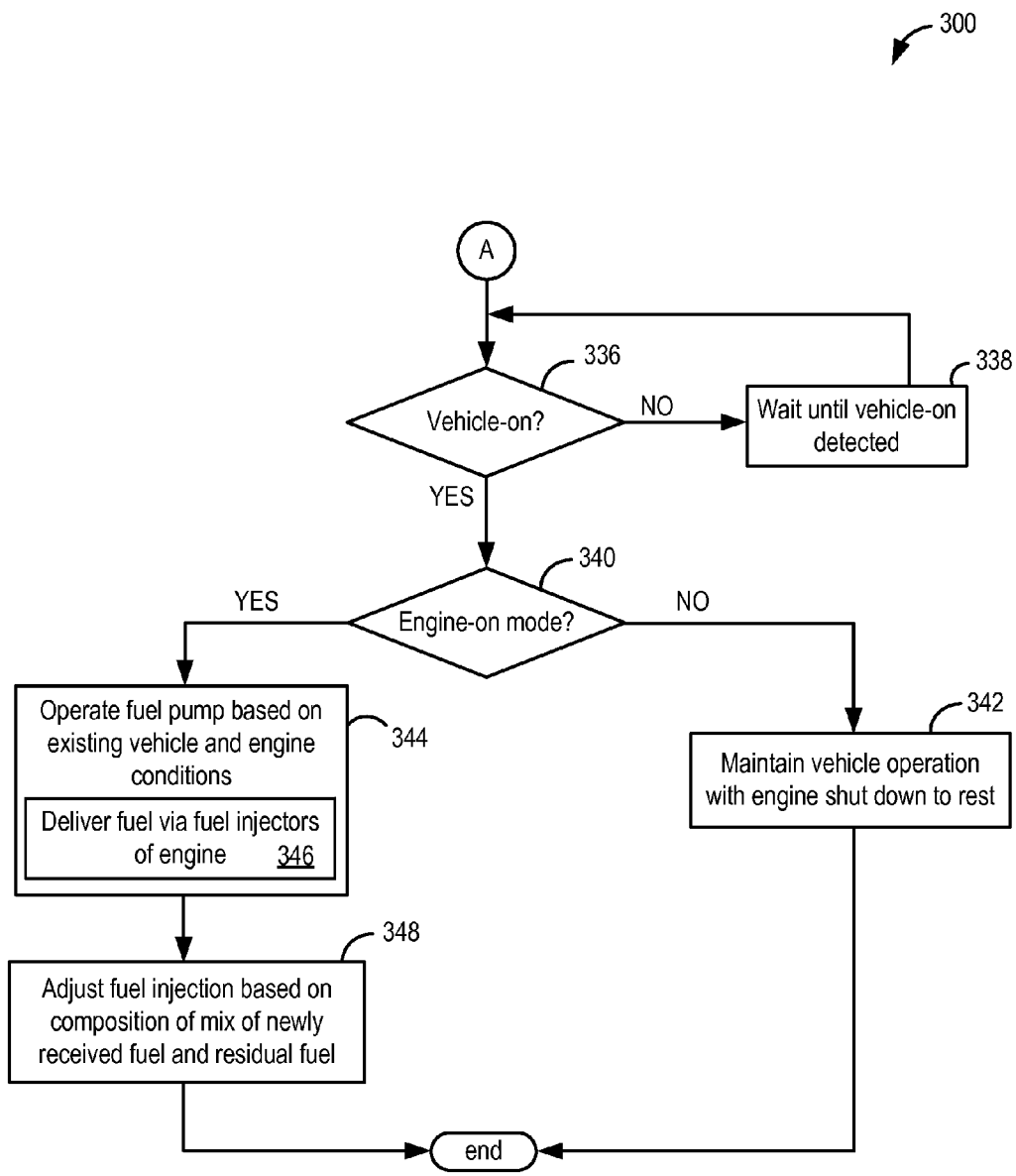
Figure 4:
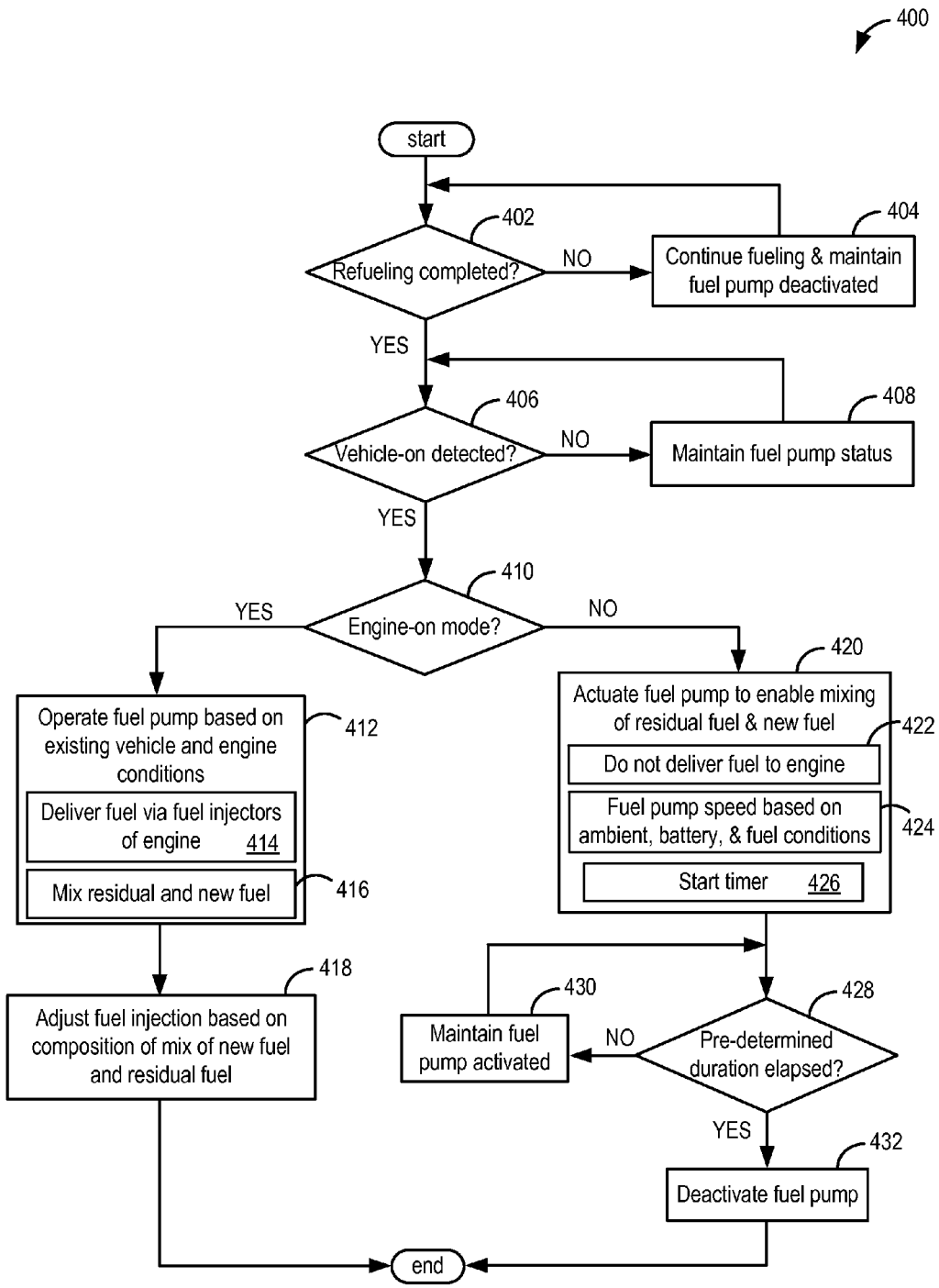
FIG. 4 is a high level flowchart for actuating the fuel pump immediately following the refueling event.

Turning now to FIGS. 3A and 3B, they show an example routine 300 illustrating a refueling event and activation of a fuel pump in response to the refueling event. Specifically, the fuel pump is activated in response to the refueling event only when the fuel tank contains an amount of residual fuel that is higher than a threshold (e.g., a fill threshold). Routine 300 will be described in relation to the systems shown in FIGS. 1 and 2 but it should be understood that similar routines may be used with other systems without departing from the scope of this disclosure. Instructions for carrying out routine 300 included herein may be executed by a controller, such as controller 12 of FIG. 2, based on instructions stored on a memory of the controller and in conjunction with signals received from sensors of the engine system, such as the sensors described above with reference to FIG. 2. The controller may employ engine actuators of the engine system, such as the actuators of FIG. 2 to adjust engine operation and vehicle operation, according to the routines described below.

At 302, routine 300 includes estimating and/or measuring existing engine and vehicle conditions. For example, routine 300 may determine if the vehicle is being propelled by an engine or a motor and if the engine is shut down to rest, such as at an idle stop. Further still, routine 300 may estimate engine speed, engine load, air-fuel ratio, etc. when the engine is combusting. In another example, routine 300 may also receive inputs regarding an existing fuel level in the fuel tank, vehicle speed, battery state of charge (SOC), etc.

At 304, routine 300 determines whether a refueling event request is anticipated or has been received. Determining whether a refueling event is anticipated or requested may include direct or indirect liquid refueling requests from the vehicle operator. Direct refueling requests may include explicit operator requests made through an interface, detection of an operator opening a refueling door, etc. Indirect liquid refueling requests may include the detection of a proximity to a refueling station. Proximity to a refueling station may be determined through GPS or other location data, or based on direct communication between the vehicle and refueling station. If a refueling event request is not detected, routine 300 proceeds to 306 to maintain vehicle operation and maintain fuel system status. For example, routine 300 may include maintaining refueling lock 245 closed. In another example, routine 300 may include maintaining an existing vehicle speed. Routine 300 then ends.

If it is determined that a refueling event is anticipated or has been requested, routine 300 continues to 308 to estimate an existing amount of residual fuel in the fuel tank. For example, the controller may receive a reading of a fuel fill level from a fuel level sensor in the fuel tank. In reference to FIG. 2, fuel fill in the fuel tank may be measured by fuel level sensor 234. Specifically, routine 300 may estimate the amount of fuel contained in the fuel tank prior to the refueling. In other words, at 308, the amount of fuel held within the fuel tank before receiving fresh fuel from the refueling pump is estimated.

Next, at 310, routine 300 determines if entry conditions for the refueling event are met. Entry conditions may include engine off conditions when an engine of the vehicle is not in operation. Specifically, the engine may be shut down to rest. For example, the vehicle may be a hybrid electric vehicle operating in an engine off mode and being powered by batteries in the vehicle. As another example, entry conditions may include a vehicle-off event wherein the vehicle is turned off, e.g., where the vehicle is parked or is not in use and the engine is not running. Entry conditions may further include a fuel tank pressure being below a pressure threshold. Fuel tank pressure may be measured by a pressure sensor, such as FTPT 291. Other conditions, such as fuel tank temperature, ambient temperature, atmospheric pressure, fuel temperature, fuel volatility of residual fuel, etc. may also be gauged prior to refueling. If entry conditions for refueling are not met (e.g., fuel tank pressure is above a threshold) routine 300 progresses to 312 to fulfill entry conditions. For example, if fuel tank pressure is above the threshold, the FTIV (e.g., FTIV 216) may be opened from close to release fuel vapors from the fuel tank to the canister. Herein, routine 300 waits until the fuel tank pressure is lower than the threshold. In another example, if the vehicle is not parked, routine 300 includes waiting until the vehicle is parked and shut down. As such, the refueling event may be delayed until entry conditions are met. In other words, refueling may not commence until entry conditions are met.

If entry conditions for refueling are met, routine 300 proceeds to 314 to unlock the refueling lock and begin fueling. As such, prior to commencing refueling routine 300 may also open (or maintain open) the FTIV while maintaining the canister vent valve (e.g., CVV 215) at open position. Further, during refueling, the canister purge valve, such as CPV 212, may be closed (if open). As such, the controller or another powertrain control module may be maintained activated, even during the key-off or vehicle-off event.

As refueling occurs, fuel fill level in the fuel tank may increase and may be monitored by the fuel level sensor. As such, a refueling event may be confirmed by an increase in fuel fill level in the fuel tank. The increase in fuel fill level may be higher than a threshold level, the threshold level being distinct from the fill threshold. The refueling event may also be confirmed by the unlocking of the refueling lock and/or insertion of a fuel nozzle in the fuel filler pipe.

At 316, routine 300 determines if the residual fuel fill estimated at 308 is higher than a threshold fill or threshold amount, Thr_R. For example, it may be determined if the fuel tank contained a substantial amount of residual fuel before refueling commenced. The threshold fill may also be termed a first fill threshold. In one example, the threshold amount may be 50% of a volume of the fuel tank. In another example, the threshold fill may be 65% of the volume of the fuel tank. In yet another example, the threshold fill may be 45% of the volume of the fuel tank. Other threshold amounts may be contemplated without departing from the scope of this disclosure.

If the amount of residual fuel in the fuel tank is higher than the threshold amount, Thr_R, adding fresh fuel during the refueling event may result in a plurality of types of fuel within the tank. For example, residual fuel may have different characteristics (e.g., volatility, ethanol content, etc.) compared to the fresh fuel received during refueling. As such, fuel in the fuel tank may be non-uniform and uneven in composition, particularly if the fuel tank is a top-feeder. However, if the fuel tank is substantially empty, e.g., 90% empty, prior to refueling, the fuel tank may largely contain a single variety of fuel after refueling. Herein, the fuel type in the fuel tank after refueling may be of the same type and mostly uniform in composition.

If routine 300 determines that the residual fuel fill prior to refueling was lower than the threshold amount, routine 300 continues to 318 to not activate the fuel pump coupled to the fuel tank. Further, at 320, fueling of the fuel tank is continued until an auto-shut off is detected. Specifically, refueling may be continued until a refueling pump has automatically shut-off. Routine 300 then ends.

In an alternative example, routine 300 may activate the fuel pump albeit at a lower speed if the amount of residual fuel fill is lower than the threshold amount (Thr_R).

On the other hand, if residual fuel fill in the fuel tank prior to refueling is higher than the threshold amount, routine 300 proceeds to one of 322 and 324. At 322, routine 400 of FIG. 4 is initiated wherein the fuel pump is activated after completion of the refueling event. Herein, the fuel pump may be operated only if the hybrid vehicle is propelled primarily by motor torque after the refueling event. Routine 400 will be described further in reference to FIG. 4 below.

Contrarily, at 324, the fuel pump is activated during the refueling event. As such, each of 322 and 324 activate the fuel pump but differ solely in the timing and duration of activation of the fuel pump. In both options (e.g., at 322 and 324), the fuel pump may be activated without fueling the engine (e.g., without supplying fuel to the injectors). In one example, such as when a battery state of charge is lower than a charge threshold, routine 300 may continue to 322 instead of 324. Herein, the fuel pump may not be activated during the refueling event as the battery state of charge may be depleted further. In another example, routine 300 may continue to 324 instead of 322 and may activate the fuel pump simultaneously with the refueling operation. For example, if the battery state of charge is lower than the charge threshold, the fuel pump may be operated concurrent to the refueling event albeit at a lower speed. In yet another example, routine 300 may select one of 322 and 324 randomly. In still another example, routine 300 may actuate the fuel pump during the refueling event as well as after the refueling event is completed if the vehicle is operating in engine-off mode. For example, the fuel pump may be operated during the refueling event as well as after the refueling event to enable improved blending of the fuels. It will be noted that proceeding to 322 to activate routine 400 may be optional.

If routine 300 proceeds to 324, the fuel pump is activated (from a disabled state) and operated concurrently with the refueling operation to enable mixing of the residual fuel and fresh fuel received during refueling. Specifically, a duration of fuel pump operation may overlap at least partially with a duration of the refueling event. In one example, the fuel pump may operate for the entire duration of the refueling event. In another example, the fuel pump may be actuated for a portion of the duration of the refueling event. The controller may actuate the fuel pump by sending a control signal to an actuator of the fuel pump. Herein, as the fuel pump is electrically powered (and not engine driven), the fuel pump may receive electrical power for actuation. At 326, while the fuel pump is operated, fuel may not be delivered to the engine via the fuel injectors. Specifically, fuel may not be injected into the engine even though the fuel pump is activated during the refueling event. In other words, the engine may remain non-operative during the refueling event despite the fuel pump being actuated.

When actuating the fuel pump in response to the refueling event, at 328, fuel pump speed may be based on ambient conditions, battery conditions, and/or fuel conditions. Ambient conditions may include ambient temperature, atmospheric pressure, ambient humidity, etc., battery conditions may include a state of charge of the battery while fuel conditions may include fuel temperature, fuel volatility, etc. For example, if the ambient temperature is higher than a temperature threshold, fuel may vaporize faster. In response to the ambient temperature being higher than the temperature threshold, the fuel pump may be operated at a lower speed during the refueling event to reduce overheating the fuel. However, if ambient temperature is lower than the temperature threshold, the fuel pump may be operated at a higher speed as a likelihood of fuel vaporization (and fuel heating) may be lower due to lower ambient temperatures. In another example, if volatility of residual fuel in the fuel tank is higher than a volatility threshold, the fuel pump maybe operated at the lower speed to reduce fuel vapor formation. Herein, the fuel pump may receive a lower voltage (or current). In yet another example, if the battery state of charge is determined to be lower than the charge threshold, the fuel pump may be operated at a lower speed. For example, the charge threshold may be 12V. In still another example, if the residual fuel fill is significantly higher (e.g., 75% of the volume of the fuel tank or 85% of the volume of the fuel tank), the fuel pump may be operated at a lower speed as the amount of newly received fuel will be considerably lower than the residual fuel amount.

Routine 300 then progresses to 330 to determine if refueling is completed. Refueling may be completed when the refueling pump shuts off automatically, in one example. In another example, refueling may be considered complete when fuel fill level in the fuel tank is above a second fill threshold. The second fill threshold may be higher than the first fill threshold, or threshold fill Thr_R at 316. For example, the second fill threshold may be 95% of the volume of the fuel tank. If refueling is not complete, routine 300 progresses to 332 to continue refueling. At the same time, the fuel pump is also maintained activated at 332. Routine 300 then returns to 330. On the other hand, if it is determined that the refueling event is complete, routine 300 continues to 334 to deactivate the fuel pump. Specifically, fuel pump operation may be terminated in response to determining that the refueling event is complete. Herein, the controller may send a signal to the actuator of the fuel pump and terminate electrical power from the battery to the fuel pump.

At 336, routine 300 determines if the vehicle has been activated e.g., powered "ON". In one example, a key-on may be detected to determine that the vehicle is "ON". As such, the vehicle may be "ON" and a vehicle start may be noted. If no, routine 300 continues to 338 to wait until the vehicle is activated and "ON". If the vehicle is "ON", routine 300 proceeds to 340 to confirm the vehicle is operating or is expected to operate in an engine-on mode. The engine-on mode of vehicle operation may be expected when a higher engine load is anticipated, in one example. Further, the engine-on mode may include the engine being activated and combusting and capable of propelling the vehicle. If it is determined that the engine is not activated, routine 300 progresses to 342 to maintain vehicle operation in an engine-off mode. As such, the vehicle may be operated in an electric mode. For example, the engine may be turned off at low load or low vehicle speed conditions and the vehicle may be propelled using motor torque alone. The engine being turned off includes the engine being shut down and maintained at rest. Routine 300 then ends.

In an alternative embodiment, the fuel pump may be re-activated when the vehicle is operating in the engine-off mode subsequent to the refueling event. As such, the fuel pump may be re-activated without fueling the engine (e.g., the fuel injectors do not deliver fuel into the engine). For example, the fuel pump may be re-activated if the mixing of the fuels during the refueling event, at 324, was insufficient, e.g. of insufficient duration.

Conversely, if the vehicle is functioning in the engine-on mode (or is expected to operate in the engine-on mode), routine 300 continues to 344 to operate the fuel pump based on existing engine operating conditions. As such, the fuel pump may be activated to fuel the engine when the engine is combusting. For example, the speed of the fuel pump may be based on the existing engine speed and/or engine load. For example, the fuel pump may be operated at a higher speed when the engine is operating at a higher load. In another example, the output of the fuel pump may be adjusted based on a desired air/fuel ratio. Further, the fuel pump delivers fuel to the fuel injectors of the engine, at 346, and the fuel injectors supply the fuel into the engine cylinders when the engine is combusting and propelling the vehicle.

Activation of the fuel pump during engine operation may also produce additional mixing of the fuel in the fuel tank.

Next, at 348 the fuel injection is regulated based on a composition of the mixed fuel in the fuel tank. The fuel tank may contain a blend of residual fuel and newly received fuel during the refueling event due to the actuation of the fuel pump during refueling. By actuating the fuel pump in response to the refueling event with residual fuel fill higher than the threshold fill, the residual fuel and the newly received fuel (during refueling) may be blended such that the fuel tank contains a fuel with characteristics that are substantially an average of those of the residual fuel and the newly received fuel. For example, the fuel tank may contain fuel with a Reid vapor pressure (RVP) value that is an average of a RVP of the residual fuel and a RVP of the newly received fuel.

As the engine begins operating, fuel characteristics may be inferred early in the drive cycle. In one example, the controller may learn an ethanol content of the mixed fuel via feedback from an exhaust gas sensor, such as sensor 226 of FIG. 2. In another example, the controller may also learn a volatility of the mixed fuel. Fuel injection amount and/or timing may be adjusted based on these learned characteristics and a desired air/fuel ratio. Routine 300 ends after 348.

In this manner, fuel pump activation during refueling may promote mixing of residual and fresh fuel. As the fuel tank comprises a more uniform composition of fuel, ethanol content of the blended fuel is estimated more reliably reducing fueling errors and allowing an improved control of air/fuel ratio. Further, when the engine is started after the refueling event, a faster start may be ensured with lower emissions.

Turning now to FIG. 4, it presents an example routine 400 for operating the fuel pump in response to the refueling event. Specifically, routine 400 activates the fuel pump immediately after the refueling event is completed instead of simultaneously with the refueling event. Routine 400 may be activated optionally after confirming that residual fuel is higher than the fill threshold at 316 in routine 300.

Routine 400 will be described in relation to the systems shown in FIGS. 1 and 2 but it should be understood that similar routines may be used with other systems without departing from the scope of this disclosure. Instructions for carrying out routine 400 included herein may be executed by a controller, such as controller 12 of FIG. 2, based on instructions stored on a memory of the controller and in conjunction with signals received from sensors of the engine system, such as the sensors described above with reference to FIG. 2. The controller may employ engine actuators of the engine system, such as the actuators of FIG. 2 to adjust engine operation and vehicle operation, according to the routines described below.

At 402, routine 400 determines whether the refueling event is complete. As described earlier in reference to routine 300, the refueling event may be completed when an auto-shut off of the refueling pump is detected. In another example, the refueling event may be complete when the refueling nozzle is removed from the fuel refueling system, e.g., a fuel fill inlet pipe. If the refueling event is determined to be ongoing, routine 400 proceeds to 404, to continue fueling the fuel tank. Further, the fuel pump may be maintained deactivated at 404.

However, if the refueling event is determined to be complete, routine 400 continues to 406 to detect if the vehicle is activated and powered "ON". In one example, a key-on may be detected to confirm that the vehicle is "ON". As such, a vehicle start may be noted. If the vehicle is not powered "ON", routine 400 continues to 408 to maintain fuel pump status and wait until the vehicle is activated and "ON". If however it is determined that the vehicle is activated, routine 400 proceeds to 410 to confirm if the vehicle is in an engine-on mode. As described earlier in reference to 340 of routine 300, the engine-on mode includes the engine being activated and combusting. In another example, routine 400 may determine if an engine-on mode of operation is expected. If the engine is operational, routine 400 continues to 412 to operate the fuel pump based on existing engine conditions. The fuel pump may also be operated based on existing vehicle conditions such as a current vehicle speed. In one example, the fuel pump may be operated at a higher speed (or to provide a higher output) when the engine speed is higher than a threshold speed. For example, if the engine is accelerating, the fuel pump may be operated at a higher speed. Alternatively, if the engine speed is lower, the fuel pump may be operated at a lower speed (or at a lower output).

Further, at 414, the fuel pump is operated to deliver fuel to the plurality of cylinders of the engine via one or more fuel injectors coupled to each cylinder of the engine. As the fuel pump is operated, fuel in the fuel tank is blended at 416. Specifically, operation of the fuel pump during the engine-on mode also enables mixing of the residual fuel and the newly received fuel following the refueling event. Herein, as the fuel pump is activated during engine operation immediately following the refueling event, the residual fuel and the newly received fuel are mixed. Next, at 418, fuel injection is adjusted based on a composition of the mixed fuel. In one example, a pulse width of the fuel injection is modulated to achieve a desired air/fuel ratio. Routine 400 then ends.

If, on the other hand, at 410, it is determined that the vehicle is operating in an engine-off mode, routine 400 progresses to 420 to activate the fuel pump to promote mixing of the newly received fuel (during the refueling event) and residual fuel existing in the fuel tank prior to refueling. Herein, the actuation of the fuel pump does not provide fuel to the engine. Specifically, at 422, the fuel injectors do not inject fuel into the engine even though the fuel pump is actuated. At 424, the fuel pump is operated at a speed that is based on existing ambient conditions, battery state of charge, and/or fuel conditions. Specifically, the fuel pump is not operated based on engine conditions. Ambient conditions may include ambient temperature, ambient pressure, ambient humidity, while fuel conditions include fuel temperature and fuel volatility amongst others. For example, if fuel temperature is higher than a threshold fuel temperature, the fuel pump may be operated at a slower (or lower) speed to reduce overheating the fuel and reduce vapor formation. Fuel pump speed may also be dependent upon an existing vapor pressure in the fuel tank. In another example, the fuel pump may be operated at the lower speed if battery state of charge is lower than a charge threshold. In one example, the charge threshold may be 12 V. In still another example, the fuel pump may be operated at a lower speed when newly received fuel amount is significantly lower than residual fuel amount. In a further example, fuel pump speed may be lower in response to residual fuel amount being significantly lower than newly received fuel amount.

At 426, a timer is activated at the same time as the fuel pump is activated at 420. For example, the timer may ensure that the fuel pump is activated for a pre-determined duration. The pre-determined duration, in one example, may be 5 minutes. In another example, the pre-determined duration may be 10 minutes. As such, the pre-determined duration may be either longer or shorter than the examples provided without departing from the scope of this disclosure. Further still, the pre-determined duration may vary based on fuel amounts of the residual fuel and the newly received fuel.

Next, at 428, routine 400 determines whether the pre-determined duration is elapsed. If no, routine 400 continues to 430 to maintain the fuel pump actuated and enable mixing of the residual fuel and the newly received fuel. Routine 400 then returns to 428. If the pre-determined duration is elapsed, routine 400 progresses to 432 to deactivate the fuel pump. As such, electrical power to the fuel pump may be terminated to deactivate and shut down the fuel pump. Routine 400 then ends.

In this manner, a fuel pump coupled to a fuel tank (e.g., positioned within the fuel tank or outside of the fuel tank) may be operated in response to a refueling event of a hybrid vehicle. The fuel pump may be actuated if the fuel fill level of residual fuel in the fuel tank prior to the refueling event is higher than the fill threshold. The fuel pump may be actuated (from being disabled prior to the refueling event) either concurrent to the duration of the refueling event or immediately subsequent to the refueling event.

When actuated during the refueling event, the fuel pump may operate for a duration that overlaps with a duration of the refueling event. In other words, the fuel pump may be actuated during the refueling event. Alternately, the fuel pump may be activated only after the refueling event is complete. Herein, the fuel pump may be activated immediately following the refueling event, and may be maintained activated for a threshold duration (e.g., the pre-determined duration) when the vehicle is operating in engine-off mode following the refueling event. In other words, the fuel pump may be activated for a duration that does not overlap with the duration of the refueling event. Said another way, the fuel pump may be activated for a duration that is mutually exclusive of the duration of the refueling event.

It will be noted that when the fuel pump is activated to blend the fuels following the refueling event with vehicle operation in an electric mode (with engine at rest), fuel may not be injected into the engine. However, if the refueling event is followed by an engine-on mode of operation, the fuel pump may be activated to supply fuel for engine combustion. The residual fuel and the newly received fuel may be serendipitously blended during the engine-on mode of vehicle operation as the fuel pump is activated to supply fuel to the engine.

By actuating the fuel pump either during the refueling event or immediately following the refueling event, residual fuel in the fuel tank may be blended with newly received fuel. Therefore, the fuel tank may comprise fuel of a more uniform composition.

As such, the actuation of the fuel pump may cause an increase in pressure within the fuel tank. Accordingly, if a leak test of the fuel system is desired during the engine-off condition, the leak test may be delayed until fuel tank pressure stabilizes. Leak detection routines may be intermittently performed by controller 12 on fuel system 240 to confirm that the fuel system is not degraded. As such, leak detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, leak detection routines may also be performed by operating a vacuum pump during engine-off conditions. If the engine is operational, leak tests may be performed using engine intake manifold vacuum. Leaks in the fuel system may be diagnosed based on an expected change in pressure in the sealed fuel system.

Figure 5:
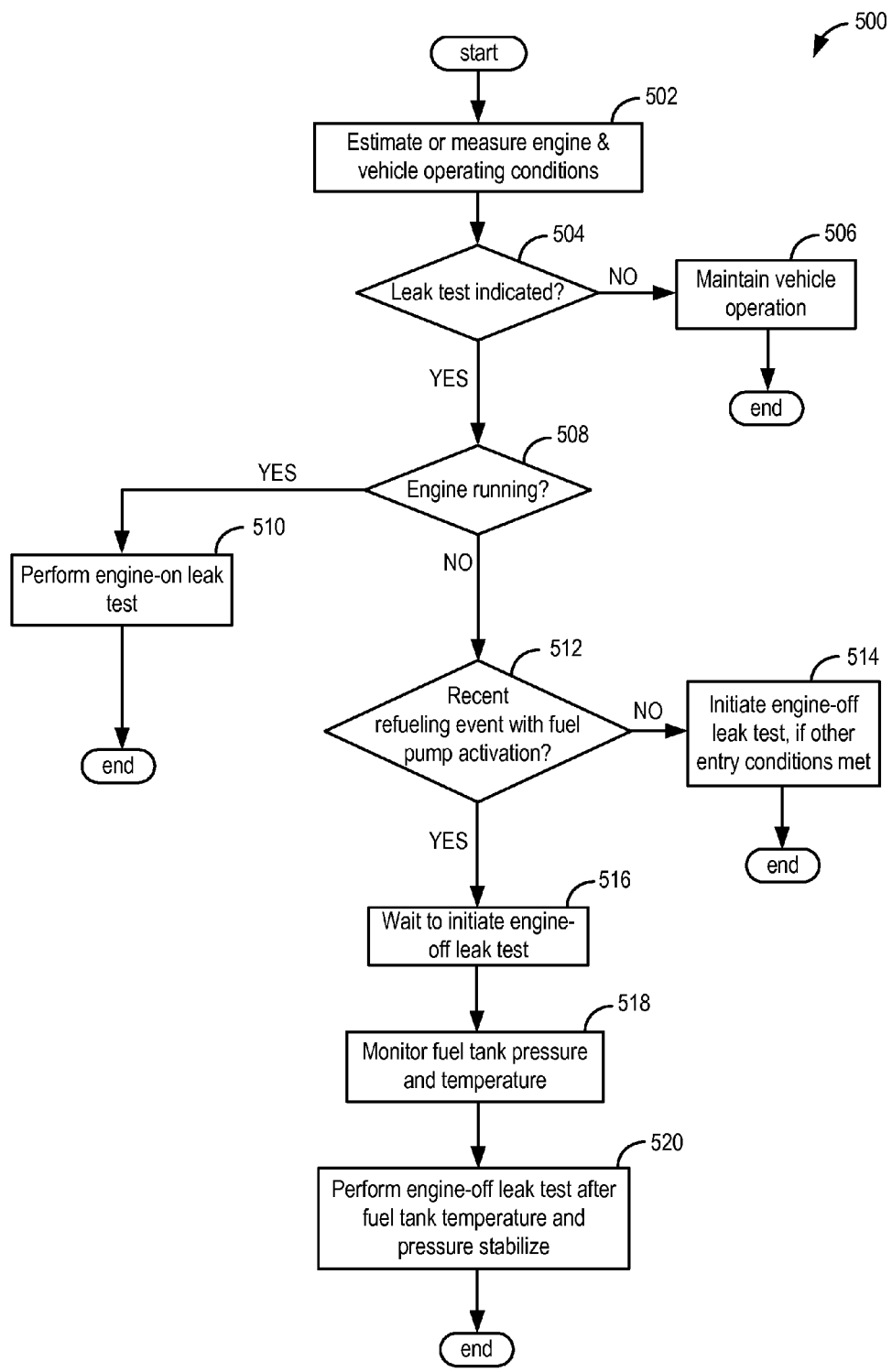
FIG. 5 portrays a high level flowchart for delaying a leak test of the fuel system responsive to the refueling event.
Figure 6:
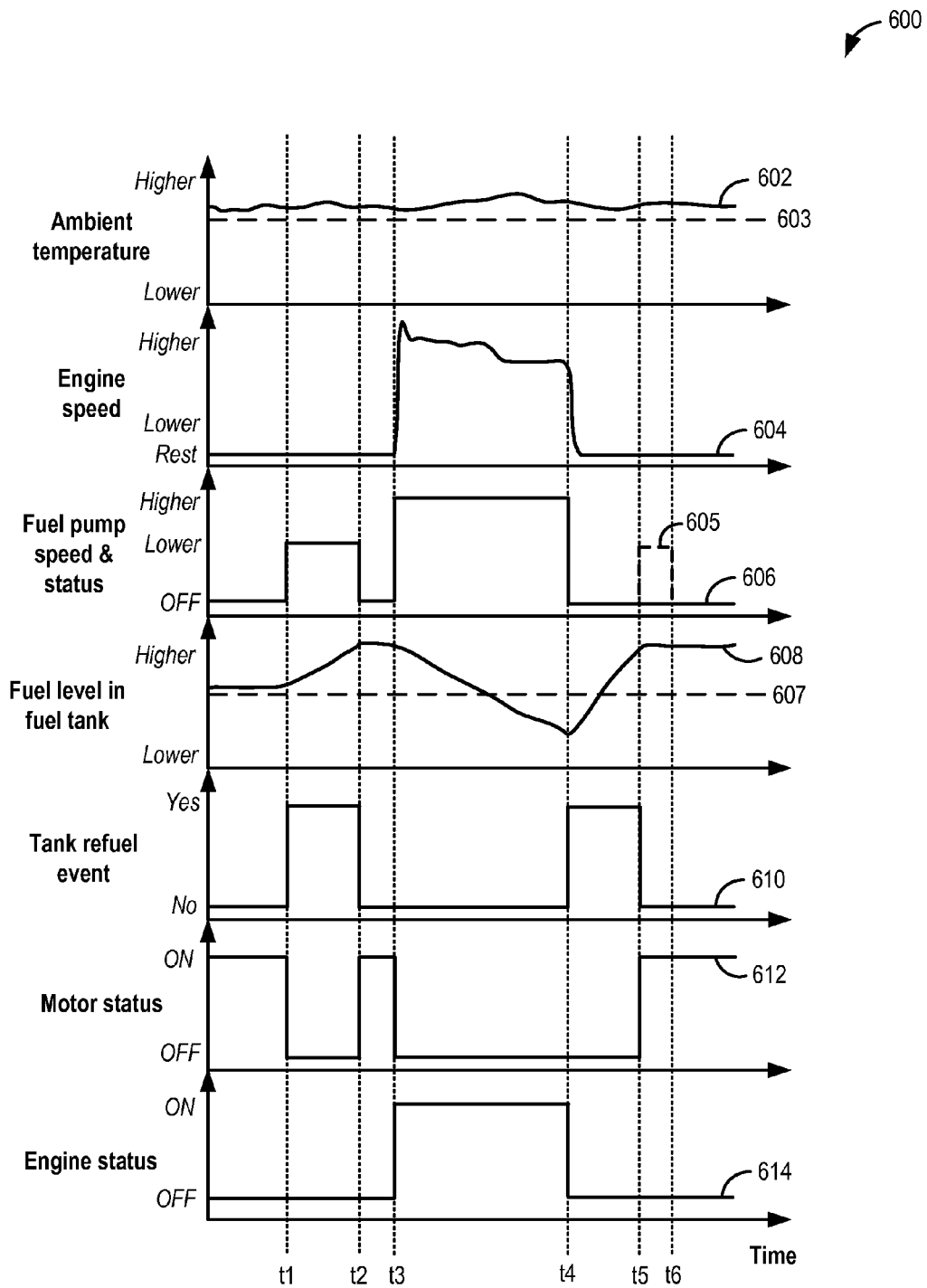
FIG. 6 illustrates an example operation of the fuel pump in response to the refueling event.

Example routine 500 of FIG. 5 demonstrates initiation of a leak test based on a preceding refueling event. Specifically, routine 500 delays a leak test in an engine-off mode if the vehicle has recently experienced a refueling event wherein the fuel pump has been activated. Routine 500 will be described in relation to the systems shown in FIGS. 1 and 2 but it should be understood that similar routines may be used with other systems without departing from the scope of this disclosure. Instructions for carrying out routine 500 included herein may be executed by a controller, such as controller 12 of FIG. 2, based on instructions stored on a memory of the controller and in conjunction with signals received from sensors of the engine system, such as the sensors described above with reference to FIG. 2. The controller may employ engine actuators of the engine system, such as the actuators of FIG. 2 to adjust engine operation and vehicle operation, according to the routines described below.

At 502, routine 500 includes determining engine and vehicle operating parameters. The engine operating parameters may include engine speed, load, fueling conditions (e.g., amount of fuel in fuel tank, whether the fuel system is in a purge mode, etc.), and time since a previous leak detection test was performed. At 504, routine 500 determines whether a leak test is indicated. The leak test may be performed periodically, such as every 100 miles driven. Further, the leak test may be performed only under certain conditions. For example, the leak test may only be performed if the engine temperature is below a threshold, if the fuel system is in standard, non-purge mode, etc. If the leak test is not indicated, routine 500 continues to 506 to maintain vehicle operation and system status. Routine 500 then ends.

On the other hand, if the leak test is indicated, for example if a threshold amount of time or distance traveled by the vehicle has elapsed since a previous test was performed, routine 500 proceeds to 508 to determine if the engine is running. Specifically, routine 500 may confirm if the engine is operating and combusting. For example, in the hybrid vehicle, the engine may be "ON" and providing the torque to propel the vehicle. If yes, routine 500 continues to 510 to perform an engine-on leak test. Various valves may be adjusted to seal the fuel system. An engine-on leak test may include applying a negative pressure on the fuel system for a duration (e.g., until a target fuel tank vacuum is reached). Herein, negative pressure generated downstream of an intake throttle in an engine intake may be applied on the fuel system. In another example, an engine-on leak test may be performed by applying a positive pressure on the fuel system for a duration (e.g., until a target fuel tank pressure is reached). For example, positive pressure generated at a turbocharger in a boosted engine system may be applied on the fuel system. In each of the above options, after application of pressure on the fuel system, the fuel system may be sealed while a change in fuel system pressure (e.g., a rate of change in the vacuum level, or a final pressure value) is monitored to determine fuel system degradation as known in the art.

If it is determined that the engine is not operational, and instead is shut down to rest, routine 500 continues to 512 to confirm if a refueling event occurred recently. Specifically, routine 500 confirms if the recent refueling event included fuel pump activation to mix residual fuel and newly received fuel. As such, the engine may be shut down when the hybrid vehicle is being propelled via motor torque. In another example, the engine may be shut down when the vehicle is parked and powered "OFF". If the vehicle was refueled recently with fuel pump activation during refueling (or immediately after refueling as in routine 400), pressure in the fuel tank and/or fuel temperature may be higher and may also be fluctuating. Pressure in the fuel tank may be monitored by the FTPT sensor such as sensor 291 of FIG. 2. Fuel temperature may also be measured by a temperature sensor coupled to the fuel tank. In one example, a recent refueling event may be a refueling event that occurred 10 minutes ago. In another example, a recent refueling event may be one that occurred 5 minutes ago. As such, fluctuations in fuel tank pressure and fuel temperature may contribute to noise in the engine-off leak test. Accordingly, the engine-off leak test may be delayed until fuel tank pressure and/or fuel temperature are stable.

If a refueling event did not occur recently, routine 500 proceeds to 514 to commence an engine-off leak test and routine 500 ends. The engine-off leak test may include activating a vacuum pump to apply a pressure on the fuel system when the engine is not operational. It will be noted that the engine-off leak test may be initiated after other conditions are met such as a threshold duration since fuel pump activation and/or engine activation.

If it is determined that the vehicle was refueled recently with fuel pump activation, routine 500 progresses to 516 to wait to initiate the engine-off leak test. Specifically, the engine-off leak test may be delayed in response to determining that a refueling event occurred recently and included fuel pump activation during (or immediately following) the refueling event. Further, at 518, fuel tank pressure and/or fuel temperature are monitored. For example, the fuel tank pressure and fuel temperature may be monitored for a duration d2, which may be a shorter duration, such as few minutes or seconds (e.g., 1-2 minutes or shorter). Next, at 520, the engine-off leak test is initiated after each of the fuel tank pressure and fuel temperature are substantially stabilized. For example, the fuel tank pressure may be substantially stabilized if change in fuel tank pressure over the duration d2 is less than 5%. Routine 500 then ends.

Thus, an engine-off leak detection routine may be delayed if a refueling event has occurred at a recent time prior to the desired leak test. The engine-off leak test may be delayed until variations in fuel tank pressure, fuel temperature, etc. are reduced.

Turning now to FIG. 6, it depicts an example refueling operation including activating a fuel pump in response to residual fuel level in the fuel tank being higher than a fill threshold in a hybrid vehicle system. As such, map 600 will be described in relation to the systems shown in FIGS. 1 and 2. Map 600 depicts ambient temperature at plot 602, engine speed at plot 604, fuel pump speed and status at plot 606, fuel level in fuel tank at plot 608, fuel tank refuel event at plot 610, motor (or generator) status at plot 612, and engine status at plot 614. Line 603 represents a temperature threshold for ambient temperature and line 607 represents a fill threshold for residual fuel fill in the fuel tank, such as Thr_R of routine 300. As such, line 607 is a threshold that helps determine whether the fuel pump is activated to enable mixing of fuel in the fuel tank responsive to the refuel event. All plots are shown over time, along the x-axis. Further, time increases from the left of the x-axis towards the right. Note that elements aligning at a common time on the graph, such as at time t1, for example, are occurring concurrently, including for example where one parameter is increasing while another parameter is decreasing.

Prior to t1, the hybrid vehicle may be operating in an engine-off mode (plot 614) with the vehicle being propelled using motor torque (plot 612). Accordingly, engine speed may be zero as the engine is at rest (plot 604). Fuel level in the fuel tank may be higher than the threshold (line 607) and the fuel pump may be deactivated ("OFF") as the engine is shut down to rest. At t1, a refuel event is requested and may also be initiated. For example, the vehicle may be "OFF" as the motor is shut down and a vehicle operator may manually unlock a refueling door, depress a refuel request button, manually open a fuel cap, etc. to request the refueling event. In other examples, a refueling lock may be unlocked by the controller when fuel tank pressure is lower than a threshold to enable refueling.

Thus, at t1 the refueling event may be initiated with the hybrid vehicle shut down (including motor and engine shut down to rest) and with residual fuel fill in the fuel tank being higher than the threshold (e.g., fill threshold represented by line 607). In response to the refueling event with residual fuel level higher than the threshold, the fuel pump is activated at t1 to enable mixing of the residual fuel with newly received fuel during the refueling event. The engine may not receive any fuel even though the fuel pump is activated. Further, since the ambient temperature is higher than the temperature threshold (line 603), the fuel pump may be operated at a lower speed. By operating at the lower speed, fuel in the fuel tank may not be heated significantly, and fuel vaporization may be reduced. Other conditions, such as ambient pressure, battery state of charge, and fuel conditions, may also determine the fuel pump speed.

The fuel tank may be refilled between t1 and t2. In response to the refueling event, fuel level in the fuel tank rises steadily between t1 and t2. Though the fuel pump is depicted as being activated between t1 and t2 (e.g., concurrently with the refueling event), in other examples the fuel pump may be activated after the refueling is complete, such as after t2. Though not shown, the fuel pump may be additionally or alternatively operated for a pre-determined duration after t2 if the subsequent vehicle operation is in the engine-off mode.

In the depicted example, the fuel pump operation is terminated at the same time that the refueling event is completed, e.g., at t2. Thus, the fuel pump is activated for the entire duration of the refueling event. The duration between t1 and t2 may be sufficient for blending the residual fuel and the newly received fuel. In alternate examples, the fuel pump may be activated for a portion of the refueling event duration. At t2, vehicle operation is resumed and the vehicle may operate for a short duration between t2 and t3 in the engine-off mode. Accordingly, the motor is operated to propel the vehicle while the engine continues at rest. The fuel pump is also shut down between t2 and t3 and fuel fill level remains substantially constant.

At t3, the engine is activated as shown by plot 614 and the motor is shut down. For example, the engine may be triggered "ON" in response to a sudden increase in torque demand such as during a tip-in event. The vehicle may, for example, be accelerated to merge onto a highway. The engine speed rises sharply at t3 (from rest) and is maintained at a substantially high speed between t3 and t4. The fuel pump is actuated simultaneously with the engine at t3 to supply fuel to the engine. Further, the fuel pump may be operated at a higher speed in response to the higher engine speed and torque demand. Specifically, the fuel pump may be operated based on existing engine operating conditions. As the engine continues to propel the vehicle, fuel fill in the fuel tank steadily decreases. By t4, the fuel level in the fuel tank is reduced to significantly below the fill threshold (line 607) and the vehicle operator may initiate or request another refueling event at t4. As such, the engine is shut down to rest at t4, and the vehicle may be "OFF".

At t4, in response to the refueling event with residual fuel fill lower than the fill threshold (line 607), the fuel pump may not be activated. Herein, the fuel tank may comprise a lower amount of residual fuel such that newly received fuel during the refueling may form a larger proportion of the fuel content in the fuel tank after the refueling event. In this case, the fuel tank may contain fuel with substantially uniform composition and additional mixing of fuel may not be desired. It will be noted that the fuel pump is not activated either during the refueling event or after the refueling event if the vehicle operates in electric mode. Fuel level in the fuel tank increases in response to the refueling event between t4 and t5, and upon completing refueling at t5, the vehicle may be activated and may be propelled by motor torque alone. Thus, the engine may remain shut down at rest after t4 and the fuel pump may not be activated as mixing of fuel is not desired.

In an alternative example, the fuel pump may optionally be activated from a shutdown state at t5, after completion of the refueling event, to operate at a lower speed to enable mixing of the residual fuel with newly received fuel (dashed plot 605). The fuel pump may be activated even though the residual fuel fill is lower than the fill threshold at t4. Further, the fuel pump may be operated at the lower speed as the residual fuel amount is significantly lower than the newly received fuel amount. Further still, the fuel pump may be operated at the lower speed for a shorter duration, such as the duration between t5 and t6, relative to the duration between t1 and t2. At t6, the fuel pump may be deactivated and shut down while the vehicle continues to operate in the electric mode. It will be noted that if the vehicle was operating in the engine-on mode immediately following the refueling event (e.g., at and after t5), the fuel pump would be activated and operated at a speed based on engine operating conditions. The actuation of the fuel pump would also enable mixing of the fuels.

It will also be noted that in yet another alternative example, the fuel pump may be activated at the lower speed concurrent with the refueling event, e.g., between t4 and t5, instead of after the refueling event as depicted herein by dashed plot 605.

In this manner, fuel composition in a fuel tank of a hybrid vehicle may be made more uniform after refueling the fuel tank despite a substantial amount of residual fuel in the fuel tank prior to refueling. A fuel pump coupled to the fuel tank may be activated in response to the refueling event with residual fuel higher than a fill threshold to enable mixing of the residual fuel with newly received fuel. The fuel pump may be activated either during the refueling event or after the refueling event is completed (e.g., if vehicle operation is electric mode) to facilitate blending of the fuels. Further, the fuel pump may be operated at a speed based on ambient conditions, battery state of charge, and fuel conditions when blending the fuels to reduce fuel vaporization. If an engine-off leak test is desired following the refueling event, the leak test may be delayed while fuel tank pressure and fuel temperature stabilize following the fuel pump activation during refueling.

In this way, a fuel pump may be utilized to mix fuel in the fuel tank. By blending the residual fuel with newly received fuel during a refueling event, a more even composition of fuel may be obtained. The technical effect of having a more even composition of fuel is that fueling errors may be reduced and engine starts may be faster. Further still, engine starts may produce lower emissions. As the fuel pump is electrically actuated, the engine may not be operated to promote the mixing of the fuel. Accordingly, fuel consumption is reduced and fuel economy as well as emissions may be improved.

An example method for a hybrid vehicle may comprise responsive to a refueling event with an amount of residual fuel in a fuel tank higher than a threshold fill, activating a fuel pump located within the fuel tank without injecting any fuel to an engine coupled in the hybrid vehicle. In the preceding example, the fuel pump may additionally or optionally be an electrically actuated pump. In any or all of the preceding examples, the fuel pump may additionally or optionally be activated concurrent to the refueling event. In any or all of the preceding examples, the fuel pump may additionally or optionally be activated following the refueling event. In any or all of the preceding examples, the method may additionally or optionally comprise maintaining operation of the fuel pump for a threshold duration responsive to vehicle operation in an engine-off mode following the refueling event. In any or all of the preceding examples, the method may additionally or optionally comprise operating the fuel pump based on engine conditions responsive to vehicle operation in an engine-on mode subsequent to the refueling event. In any or all of the preceding examples, the refueling event may additionally or optionally be confirmed via one or more of unlocking of a refueling lock, insertion of a fuel nozzle in a fuel filler pipe, and an increase in an amount of fuel fill in the fuel tank. In any or all of the preceding examples, the method may additionally or optionally comprise blending the residual fuel with newly received fuel. In any or all of the preceding examples, the method may additionally or optionally comprise delaying a leak test of the fuel tank until a pressure in the fuel tank is stabilized after the refueling event.

Another example method for a hybrid vehicle may comprise during a first condition, activating the fuel pump and delivering fuel to an engine of the hybrid vehicle (e.g., via a plurality of fuel injectors), the fuel pump operating at a speed based on engine operating conditions, and during a second condition, activating the fuel pump without delivering fuel to the engine, the fuel pump operating at a speed based on ambient conditions, battery state of charge, and fuel conditions. In the preceding example, the first condition may additionally or optionally include an engine-on condition wherein the engine is combusting and propelling the hybrid vehicle, and wherein the second condition may additionally or optionally include each of a refueling event with the engine shut down to rest, the hybrid vehicle shut down, and residual fuel level in a fuel tank of the hybrid vehicle higher than a fill threshold. In any or all of the preceding examples, during the first condition the speed of the fuel pump may be additionally or optionally based on engine operating conditions including one or more of engine speed, engine load, and air/fuel ratio. In any or all of the preceding examples, during the second condition the speed of the fuel pump may be additionally or optionally based on one or more of ambient conditions and fuel conditions including ambient temperature, fuel volatility, and fuel temperature. In any or all of the preceding examples, during the second condition, the fuel pump may be additionally or optionally operated at a lower speed responsive to one or more of ambient temperature higher than a temperature threshold, fuel volatility higher than a volatility threshold, battery state of charge lower than a charge threshold, and fuel temperature higher than a threshold fuel temperature.

An example system for a hybrid vehicle may comprise an engine, a fuel tank including a fuel level sensor, a fuel pump coupled to the fuel tank, the fuel pump being electrically actuated, a refueling lock, and a controller configured with instructions stored in non-transitory memory and executable by a processor for in response to a refueling event with the amount of residual fuel fill in the fuel tank being higher than a threshold, activating a fuel pump in the fuel tank for a duration, mixing residual fuel with newly received fuel in the fuel tank, and adjusting a fuel injection amount based on a composition of mixed fuel in the fuel tank during subsequent engine operation. In the preceding example, the system may additionally or optionally comprise an exhaust gas sensor, and wherein the composition of the mixed fuel may be additionally or optionally determined by the exhaust gas sensor. In any or all of the preceding examples, the duration that the fuel pump is activated for may additionally or optionally occur during the refueling event. In any or all of the preceding examples, the duration that the fuel pump is activated for may additionally or optionally be mutually exclusive of a duration of the refueling event, the duration of fuel pump activation occurring immediately following the refueling event. In any or all of the preceding examples, the controller may additionally or optionally include further instructions for in response to the refueling event with the amount of residual fuel fill in the fuel tank being lower than the threshold, not activating the fuel pump for the duration. In any or all of the preceding examples, the refueling event may additionally or optionally be indicated by one or more of unlocking the refueling lock and an increase in fill level of the fuel tank, as measured by the fuel level sensor.

In an alternate example representation, the controller may additionally or optionally include further instructions for in response to the refueling event with the amount of residual fuel fill in the fuel tank being lower than the threshold, activating the fuel pump and operating the fuel pump at a lower speed. Further, the controller may additionally or optionally operate the fuel pump at the lower speed for a shorter duration. In all or any of the preceding examples, the fuel pump may additionally or optionally be operated either concurrent with the refueling event or after the refueling event is completed. In yet another alternate example representation, the controller may additionally or optionally include further instructions for in response to the refueling event with the amount of residual fuel fill in the fuel tank being significantly higher than the newly received fuel, activating the fuel pump and operating the fuel pump at a lower speed. In all or any of the preceding examples, the fuel pump may additionally or optionally be operated concurrent with the refueling event and/or after the refueling event is completed.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a hybrid vehicle, comprising:
responsive to a refueling event with an amount of residual fuel in a fuel tank higher than a threshold fill,
during an engine-on mode, activating a fuel pump located within the fuel tank and delivering fuel to an engine coupled in the hybrid vehicle; and
during an engine-off mode, activating the fuel pump without delivering fuel to the engine, the activating the fuel pump responsive to each of a refueling event with the engine shut down to rest, a residual fuel level in the fuel tank higher than the threshold fill, and the hybrid vehicle shut down.

2. The method of claim 1, wherein the fuel pump is an electrically actuated pump.

3. The method of claim 1, wherein the fuel pump is activated concurrent to the refueling event.

4. The method of claim 1, wherein the fuel pump is activated following the refueling event.

5. The method of claim 4, further comprising maintaining operation of the fuel pump for a threshold duration responsive to vehicle operation in the engine-off mode following the refueling event.

6. The method of claim 1, further comprising operating the fuel pump based on engine conditions responsive to vehicle operation in the engine-on mode subsequent to the refueling event.

7. The method of claim 1, wherein the refueling event is confirmed via one or more of unlocking of a refueling lock, insertion of a fuel nozzle in a fuel filler pipe, and an increase in an amount of fuel fill in the fuel tank.

8. The method of claim 1, further comprising blending the residual fuel with newly received fuel.

9. The method of claim 1, further comprising delaying a leak test of the fuel tank until a pressure in the fuel tank is stabilized after the refueling event.

10. A method for a hybrid vehicle, comprising:
during a first condition, activating a fuel pump and delivering fuel to an engine of the hybrid vehicle, the fuel pump operating at a speed based on engine operating conditions; and
during a second condition, activating the fuel pump without delivering fuel to the engine, the fuel pump operating at a speed based on ambient conditions, battery state of charge, and fuel conditions, wherein the second condition includes each of a refueling event with the engine shut down to rest, a residual fuel level in a fuel tank higher than a threshold, and the hybrid vehicle shut down.

11. The method of claim 10, wherein the first condition includes an engine-on condition wherein the engine is combusting and propelling the hybrid vehicle, and wherein the refueling event is confirmed via one or more of unlocking of a refueling lock, insertion of a fuel nozzle in a fuel filler pipe, and an increase in an amount of fuel fill in the fuel tank.

12. The method of claim 10, wherein during the first condition, the speed of the fuel pump is based on engine operating conditions including one or more of engine speed, engine load, and air/fuel ratio.

13. The method of claim 12, wherein during the second condition, the speed of the fuel pump is based on one or more of ambient conditions and fuel conditions including ambient temperature, fuel volatility, and fuel temperature.

14. The method of claim 13, wherein during the second condition, the fuel pump is operated at a lower speed responsive to one or more of ambient temperature higher than a temperature threshold, fuel volatility higher than a volatility threshold, battery state of charge lower than a charge threshold, and fuel temperature higher than a threshold fuel temperature.

15. A system for a hybrid vehicle, comprising:
an engine;
a fuel tank including a fuel level sensor;
a fuel pump coupled to the fuel tank, the fuel pump being electrically actuated;
a refueling lock; and
a controller configured with instructions stored in non-transitory memory and executable by a processor for:
in response to a refueling event with an amount of residual fuel fill in the fuel tank being higher than a threshold,
activating the fuel pump in the fuel tank for a duration responsive to each of a refueling event with the engine shut down to rest, a residual fuel level in the fuel tank higher than a threshold, and the hybrid vehicle shut down;
mixing residual fuel with newly received fuel in the fuel tank; and
adjusting a fuel injection amount based on a composition of mixed fuel in the fuel tank during subsequent engine operation.

16. The system of claim 15, further comprising an exhaust gas sensor, and wherein the composition of the mixed fuel is determined by the exhaust gas sensor.

17. The system of claim 15, wherein the duration that the fuel pump is activated for occurs during the refueling event.

18. The system of claim 15, wherein the duration that the fuel pump is activated for is mutually exclusive of a duration of the refueling event, the duration of fuel pump activation occurring immediately following the refueling event.

19. The system of claim 15, wherein the controller includes further instructions for:

in response to the refueling event with the amount of residual fuel fill in the fuel tank being lower than the threshold, not activating the fuel pump for the duration.

20. The system of claim 15, wherein the refueling event is indicated by one or more of unlocking the refueling lock and an increase in fill level of the fuel tank, as measured by the fuel level sensor.

\* \* \* \* \*